(12) United States Patent
Li et al.

(10) Patent No.: US 11,783,227 B2
(45) Date of Patent: Oct. 10, 2023

(54) METHOD, APPARATUS, DEVICE AND READABLE MEDIUM FOR TRANSFER LEARNING IN MACHINE LEARNING

(71) Applicant: BEIJING BAIDU NETCOM SCIENCE AND TECHNOLOGY CO., LTD., Beijing (CN)

(72) Inventors: Xingjian Li, Beijing (CN); Haoyi Xiong, Beijing (CN); Jun Huan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 633 days.

(21) Appl. No.: 16/998,616

(22) Filed: Aug. 20, 2020

(65) Prior Publication Data
US 2021/0065058 A1 Mar. 4, 2021

(30) Foreign Application Priority Data
Aug. 29, 2019 (CN) .......................... 201910820648.6

(51) Int. Cl.
G06N 20/00 (2019.01)
G06N 3/08 (2023.01)
G06F 11/34 (2006.01)
G05B 13/04 (2006.01)
G06F 18/214 (2023.01)

(52) U.S. Cl.
CPC ............ *G06N 20/00* (2019.01); *G05B 13/042* (2013.01); *G06F 11/3452* (2013.01); *G06F 18/214* (2023.01); *G06N 3/08* (2013.01)

(58) Field of Classification Search
None
See application file for complete search history.

(56) References Cited

PUBLICATIONS

Das A, Hasegawa—Johnson M. Cross—lingual transfer learning during supervised training in low resource scenarios. In Sixteenth Annual Conference of the International Speech Communication Association 2015. (Year: 2015).*
Day O, Khoshgoftaar TM. A survey on heterogeneous transfer learning. Journal of Big Data. Dec. 2017;4:1-42. (Year: 2017).*
Paul, M. Lecture notes for Applied Machine Learning, lecture 6 'Regularization', Sep. 19, 2017. Available at https://cmci.colorado.edu/classes/INFO-4604/fa17/files/slides-6_regularization.pdf. Accessed May 19, 2023. (Year: 2017).*

* cited by examiner

*Primary Examiner* — Vincent Gonzales
(74) *Attorney, Agent, or Firm* — Brooks Kushman P.C.

(57) ABSTRACT

A method, apparatus, device and readable medium for transfer learning in machine learning are provided. The method includes: constructing a target model according to the number of classes to be achieved by a target task and a duly-trained source model; obtaining a value of a regularized loss function of the corresponding target model and a value of a cross-entropy loss function of the target model, based on sets of training data in a training dataset of the target task; according to the value of the regularized loss function and the value of the cross-entropy loss function corresponding to each set of training data, updating parameters in the target model by a gradient descent method to implement the training of the target model. The above technical solution avoids excessive constraints on parameters in the prior art, thereby refraining from damaging the training effect of the source model on the target task.

17 Claims, 3 Drawing Sheets

METHOD, APPARATUS, DEVICE AND READABLE MEDIUM FOR TRANSFER LEARNING IN MACHINE LEARNING

CROSS-REFERENCE TO RELATED APPLICATIONS

The present application claims the priority of Chinese Patent Application No. 201910820648.6, filed on Aug. 29, 2019, with the title of "Method, apparatus, device and readable medium for transfer teaming in machine learning". The disclosure of the above applications is incorporated herein by reference in its entirety.

TECHNICAL FIELD

The present disclosure relates to the technical field of computer application, and particularly to a method, apparatus, device and readable medium for transfer learning in machine learning.

BACKGROUND

Artificial intelligence (A) is a new technological science which reaches and develops theories, methods, techniques and application systems for simulating, extending and expanding human intelligence. Artificial intelligence, as a branch of computer science, is intended to learn about essence of intelligence and creates a new intelligent machine which is capable of responding in a manner similar to human intelligence. Research in the field includes robots, language recognition, image recognition, natural language processing, expert systems and the like.

Due to the heat of AI, training of various deep learning-based models already becomes a very important job in various fields. At present, deep learning achieves great success in many tasks of assessing for example images and speech, but it depends on a large number of marking samples. However, many actual tasks only have a limited number of marking samples, training directly with the deep learning model is very prone to cause over-fitting, and it is impossible to learn a high-quality model having a generalization capability. Based on this, researchers develop a transfer learning method which specifically involves how to effectively use a source model trained with big data to perform knowledge transfer and help the target task to boost the effect of model training when the number of samples of a target task is small. In the prior art, there are two types of main means of transfer learning: one type is directly considering the source model as a starting point, continuing to fine-tune parameters with respect to the target task, and constraining the parameters nearby 0, namely, a standard fine-tuning method provided in the deep learning framework by default, this method is briefly called an FT method; the other type is considering the source model as a starting point, continuing to fine-tune parameters with respect to the target task, but constraining the parameters nearby the source model to prevent the model from over-fitting on the target task of a small number of samples, this method is referred to as a Starting Point As Reference (SPAR) method.

However, the above two types of transfer learning methods both include constraining with respect to the parameters themselves in respect of training of the new task. Such constraint might be too stringent, detrimental to the training effect of the source model on the new task, and causes undesirable accuracy and reliability of the target model trained based on the new task.

SUMMARY

The present disclosure provides a method, apparatus, device and readable medium for transfer learning in machine learning, to improve the accuracy and reliability of a target model trained based on a new task.

The present disclosure provides a method for transfer learning in machine learning, the method including: constructing a target model according to the number of classes to be achieved by a target task and a duly-trained source model; obtaining a value of a regularized loss function of the corresponding target model and a value of a cross-entropy loss function of the target model, based on sets of training data in a training dataset of the target task; according to the value of the regularized loss function and the value of the cross-entropy loss function corresponding to each set of training data, updating parameters in the target model by a gradient descent method to implement the training of the target model.

The present disclosure provides an apparatus for transfer learning in machine learning, the apparatus including: a construction module configured to construct a target model according to the number of classes to be achieved by a target task and a duly-trained source model; an obtaining module configured to obtain a value of a regularized loss function of the corresponding target model and a value of a cross-entropy loss function of the target model, based on sets of training data in a training dataset of the target task; a training module configured to, according to the value of the regularized loss function and the value of the cross-entropy loss function corresponding to each set of training data, update parameters in the target model by a gradient descent method and implement the training of the target model.

The present disclosure further provides a computer device, including: one or more processors, a memory for storing one or more programs, the one or more programs, when executed by said one or more processors, enable said one or more processors to implement the above-mentioned method for transfer learning in machine learning.

The present disclosure further provides a computer readable medium on which a computer program is stored, the program, when executed by a processor, implementing the above-mentioned method for transfer learning in machine learning.

The method, apparatus, device and readable medium for transfer learning in machine learning in the present disclosure, by employing the above technical solutions, avoid excessive constraints on parameters in the prior art, thereby refraining from damaging the training effect of the source model on the target task, and thereby effectively improving the accuracy and reliability of the target model trained based on the target task.

DETAILED DESCRIPTION

The present disclosure will be described in detail with reference to figures and specific embodiments to make objectives, technical solutions and advantages of the present disclosure more apparent.

Figure 1:
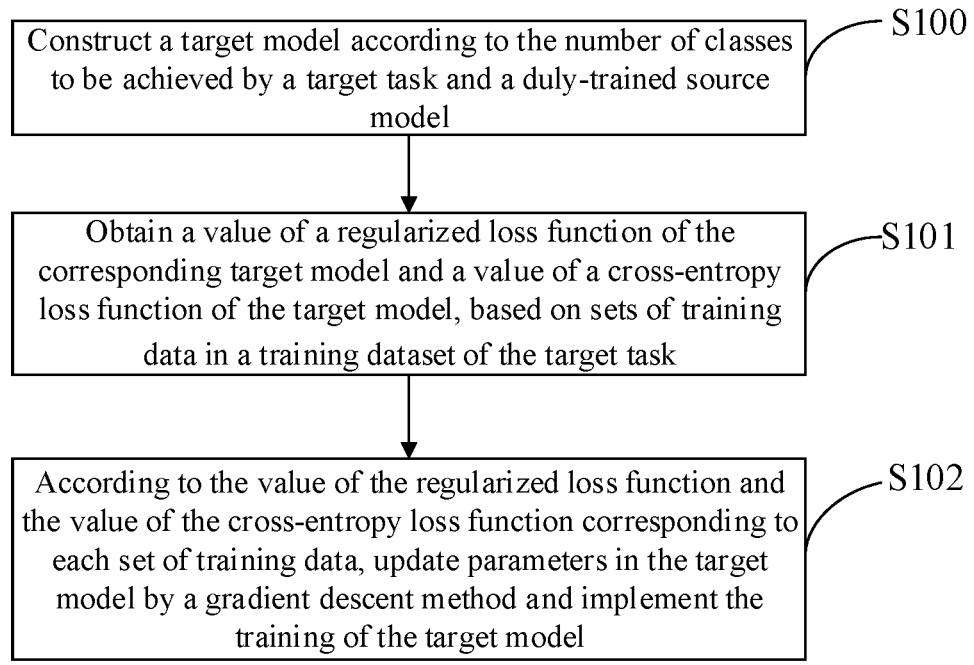
FIG. 1 is a flow chart of a method for transfer leaning in machine learning according to an embodiment of the present disclosure.

FIG. 1 is a flow chart of a method for transfer leaning in machine learning according to an embodiment of the present disclosure. As shown in FIG. 1, the transfer learning method in machine leaning according to the present embodiment may specifically include the following steps:

S100: constructing a target model according to the number of classes to be achieved by a target task and a duly-trained source model;

A subject for executing the transfer learning method in the machine learning according to the present embodiment may be an independent electronic entity, or may be a transfer leaning device in machine learning for training the target model corresponding to the target task in the transfer learning manner and based on the target task and the pre-trained source mode.

The target task of the present embodiment may include a training dataset and the number of classes to be implemented by the target task. Relatively speaking, since the training is performed in the transfer learning manner and based on the already trained source model, the training dataset according to the present embodiment includes a limited number of training data relative to general-purpose model training. In the present embodiment, the target model to be trained based on the target task is a logistic regression model for implementing classification. Specifically, the classes to be implemented by the target model according to the present embodiment may be two classes, or may be multiple classes.

Specifically, in the present embodiment, it is possible to replace the original fully-connected layer of the pre-trained source model with a new fully-connected layer adapted for the number of classes to be implemented by the target task, to obtain the target model. In the present embodiment, the source model and the target model are each divided into two portions: a feature extraction network layer and a fully-connected layer. First, when the target model is built, the feature extraction network layer of the source model remains unchanged, whereas the fully-connected layer is replaced with the fully-connected layer adapted for the classes to be implemented by the target task. As such, the embryonic form of the target model is obtained.

S101: obtaining a value of a regularized loss function of the corresponding target model and a value of a cross-entropy loss function of the target model, based on sets of training data in a training dataset of the target task;

In the present embodiment, during the training of the target model, training is performed with a mini-batch training data as the objects. Hence, it is necessary to divide all training data in the training dataset into a plurality of sets, and each set of training data corresponds to a portion of min-batch training data. For example, in the present embodiment, each set of training data may include tens of to hundreds of training data, for example 32 or 64 pieces of training data or another number of training data, which is not limited herein.

In addition, the training data in the present embodiment includes two portions of information: one portion is a data portion, and the other portion is a tag portion. The step 101 may specifically include the following two steps:

(a1) obtaining the value of the regularized loss function of the corresponding target model based on a data portion of each set of training data in the training dataset of the target task;

(b1) obtaining the value of the cross-entropy loss function of the corresponding target model, based on a tag portion of each set of training data in the training dataset of the target task.

Reference may be made to the prior art for details of the implementation of step (b1), which will not be detailed any more here. The value of the cross-entropy loss function may be represented as Le.

Upon specific implementation, the step (a1) obtaining the value of the regularized loss function of the corresponding target model based on a data portion of each set of training data in the training dataset of the target task may include the following steps:

(a2) according to the data portion of each set of training data in the training dataset of the target task, respectively obtaining feature maps of each filter in the feature extraction network layer of the target model and feature maps of each filter in a feature extraction network side layer of the source model;

(b2) calculating a feature map loss of the corresponding filter, according to the feature maps of each filter in the feature extraction network layer of the target model and the feature maps of each filter in the feature extraction network layer of the source model, and an obtained attention weight of each filter;

For example, in the present embodiment, it is specifically possible to use formula $W_i*Norm(FMS_i-FMT_i)$ to calculate a feature map loss of the corresponding filter, where $W_i$ is an attention weight of the filter, $FMS_i$ and $FMT_i$ are respectively feature maps of the corresponding filter in the feature extraction network layers of the source model and the target model, and Norm employs L2 norm.

(c2) accumulating feature map losses of all filters as a value of a regularized loss function of the corresponding target model.

For example, currently a set of training data are being used for training, according to the above steps (a2)-(c2), the set of training data are concurrently and respectively input into the target model and source model, and feature maps generated by each filter in the feature extraction network layers of the target model and the source model are stored, for example, the feature maps of the filter corresponding to the target model may be represented as $FMT_i$, and the feature maps of the filter corresponding to the source model may be represented as $FMS_i$. Then, the feature map loss of each filter may be calculated with the above formula. Finally, the feature maps of all filters are accumulated to obtain the regularized loss corresponding to the target model, and the regularized loss may be represented as Lr.

After training is performed one time, parameters of the target model are updated. When next set of training data are used for training, the training needs to be performed based on the target model whose parameters are already updated. Likewise, in this manner, the corresponding regularized loss Lr may be obtained. Conversely, it is also possible to, as for each set of training data, obtain the corresponding regularized loss Lr based on the target model whose parameters are updated after the previous training in this manner.

Further optionally, in the present embodiment, before step S101 "obtaining a value of a regularized loss function of the corresponding target model and a value of a cross-entropy loss function of the target model, based on sets of training data in a training dataset in a target task", the method may further include: configuring an attention weight for each filter in the feature extraction network layer of the target model, according to the training dataset of the target task.

In the present embodiment, configuring an attention weight for each filter in the feature extraction network layer of the target model does not change in the training process of the target model.

Furthermore, the configuring an attention weight for each filter in the feature extraction network layer of the target model, according to the training dataset of the target task may specifically include the following steps:

(a3) performing initial training for a fully-connected layer of the target model with the training dataset of the target task;

(b3) calculating a value of a network loss function obtained after initial training;

(c3) for the filters in the feature extraction network layer of the target model after the initial training, setting the corresponding parameter to 0, and calculating a change amount of the corresponding value of the network loss function;

(d3) normalizing the change amounts of the values of the network loss function of all filters in the feature extraction network layer of the target model, to obtain the normalized change amount of the value of the network loss function of each filter, and taking the normalized change amount as the attention weight of the corresponding filter.

It needs to be noted here that the parameters of the feature extraction network layer of the target model constructed in the above step S100 are consistent with those of the duly-trained source model, whereas the newly-replaced fully-connected layer does not have parameters. It is necessary to initialize parameters for the fully-connected layer randomly before employing steps (a3)-(d3) to configure the attention weight.

During the initial training of the present embodiment, training is only performed for the fully-connected layer of the target model. In the specific training process, it is possible to input a piece of or a set of training data into the target model, adjust the parameters of the fully-connected layer of the target model according a direction of convergence of the loss function of the network, employ the training dataset to perform preset rounds of training for the target model according to a predetermining plan, to achieve the initial training of the target model.

In the present embodiment, the training data included in training dataset of the target task may be divided into arrays. During the training, training the data with the arrays involves one time of training, and may be referred to as one round of training. Since the training data included in the training dataset of the target task in the present embodiment are limited, it is possible to set to perform a preset number of rounds of training to achieve the training effect and then end up the training.

The embryonic form of the target model may be determined after the initial training of the target model is performed. At this time, the parameters of the feature extraction network layer of the target model are consistent with those in the source model, and the parameters of the fully-connected layer are obtained through the initial training. At this time, it is possible to first calculate the value of the network loss function obtained after the initial training, and then, with respect to filters in the feature extraction network layer of the target model, set the corresponding parameter, namely, weight, to 0, and calculate the change amount of the value of the corresponding network loss function. The change amount of the value of the network loss function may characterize the importance of the filter in the feature extraction network layer. To more reasonably characterize the importance of the respective filters, in the present embodiment it is possible to normalize the change amounts of the values of the network loss function of all filters in the feature extraction network layer of the target model to obtain the normalized change amount of the value of the network loss function of each filter, and regard the normalized change amount as the attention weight of the corresponding filter. The attention weight of each filter is invariable in the subsequent training process. The value of the regularized loss function of the target model may be obtained subsequently further based on the attention weight of the obtained each filter.

S102: according to the value of the regularized loss function and the value of the cross-entropy loss function corresponding to each set of training data, updating the parameters in the target model by a gradient descent method and implement the training of the target model.

In the present embodiment, the parameters in the target model are updated by a gradient descent method based on the value of the regularized loss function and the value of the cross-entropy loss function. Specifically, in each training, it is possible to calculate the gradient of each parameter in the network by using the value of the regularized loss function and the value of the cross-entropy loss function obtained from the current training dataset, and then perform reverse propagation to cause each parameter to be adjusted in a gradient descent direction to update each parameter in the target model. For each training, each parameter in the target model is updated in a similar manner.

Specifically, the training process in step S102 may specifically include the following steps:

(a4) updating the parameters in the target model by a gradient descent method by using the value of the regularized loss function and the value of the cross-entropy loss function corresponding to any set of training data, so that a sum of the value of the regularized loss function and the value of the cross-entropy loss function tends to be 0;

(b4) updating the parameters in the target model by the gradient descent method by using the value of the regularized loss function and the value of the cross-entropy loss function obtained with next set of training data and based on the updated parameters in the target model, so that the sum of the value of the regularized loss function and the value of the cross-entropy loss function tends to be 0;

Repeating the preceding step (b4) until completing a preset number of rounds of training with the respective sets of training data in the training dataset, determining the parameters of the target model and thereby determining the target model.

In the present embodiment, each parameter changes in a gradient descent direction, namely, a direction in which the sum of the value of the regularized loss function and the value of the cross-entropy loss function tends to be 0.

Based on the above depictions, after completing the construction of the target model and configuring the attention weight of each filter of the feature extraction network layer of the target model, the training process of the present embodiment may further be expressed as follows:

A. selecting a set of training data from the training dataset as the current set of training data;

B. obtaining the value of the regularized loss function and the value of the cross-entropy loss function of the target model by using the selected set of training data in the manner of the above embodiment;

C. updating the parameters in the target model by a gradient descent method according to the value of the regularized loss function and the value of the cross-entropy loss function corresponding to the set of training data, so that the parameters are adjusted in a gradient descent direction;

D. selecting next set of training data from the training dataset;

E. obtaining the value of the regularized loss function and the value of the cross-entropy loss function of the target model by using the selected next set of training data, based on the target model whose parameters are updated and in the manner of the above embodiment;

F. updating the parameters in the target model by the gradient descent method according to the value of the regularized loss function and the value of the cross-entropy loss function corresponding to the selected next set of training data, so that the parameters are adjusted in the gradient descent direction.

Repeating the above steps D-F, until completing a preset number of rounds of training with the respective sets of training data in the training dataset, determining the parameters of the target model and thereby determining the target model, whereupon the transfer learning of the target model is completed.

With the above technical solution, the transfer learning method in the machine learning in the present embodiment avoids excessive constraints on parameters in the prior art, thereby refraining from damaging the training effect of the source model on the target task, and thereby effectively improving the accuracy and reliability of the target model trained based on the target task.

In addition, during the transfer from the source model task to the target task, not all parameters should be constrained with equal intensity. On account of the difference between the target task and source task, generally partial parameters do not have transfer value, and constraints on such parameters are prone to cause negative transfer. Hence, performing constraints on all parameters according to the two solutions in the prior art will cause occurrence of the negative transfer.

Furthermore, as compared with the FT method and SPAR method in the prior art, the attention weight of the filter proposed in the transfer learning method in the machine learning of the present embodiment can help the target model to selectively transfer the knowledge of the source model, effectively retain knowledge valuable for the target task, and do not perform excessive transfer for the filters not valuable for the target task to allow them to fit sufficiently on the new target task and avoid negative transfer. Furthermore, in contrast, as lacking the constraints on the parameters of the source model, the FT method cannot achieve sufficient knowledge transfer, and is liable to cause excessive fitting on the limited target task data. According to the SPAR method, knowledge transfer is performed for all filters of the source model, and the space of selecting filters in the target model is excessively limited. When partial filters of the source model is not valuable for the target task, such excessive constraints waste the expression capability of the target model. Conversely, in the technical solution of the present embodiment, use of the attention weights of filters can not only avoid negative transfer but also effectively ensure the expression capability of the target model, thereby effectively improving the accuracy and reliability of the target model trained based on the target task.

Again, in the present embodiment, using the feature maps as the objects calculated by the regularized loss is also different from the SPAR method in the prior art. In the SPAR method, the difference of the weights of the filters themselves between the target model and source model is used as the constrained object. On account of the property of excessive parameterization of the deep neural network, i.e., the same function may be implemented by many different parameter combinations. In this way, constraints of the feature maps achieve a final purpose of knowledge transfer, provide a larger optimization space to parameters and achieve a better effect than constraints of the parameters. This further indicates that use of the technical solution of the present embodiment can effectively improve the accuracy and reliability of the target model trained based on the target task.

Figure 2:
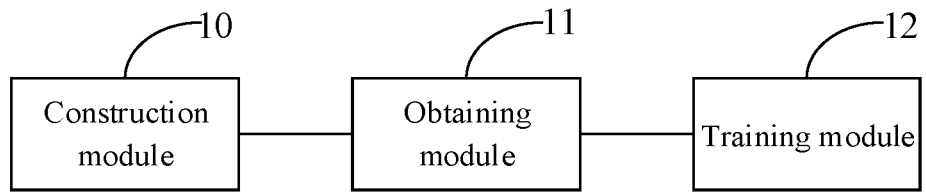
FIG. 2 is a block diagram of an apparatus for transfer leaning in machine learning according to a first embodiment of the present disclosure.

FIG. 2 is a block diagram of an apparatus for transfer leaning in machine learning according to a first embodiment of the present disclosure. As shown in FIG. 2, the transfer leaning apparatus in machine learning of the present embodiment may specifically include: a construction module 10 configured to construct a target model according to the number of classes to be achieved by a target task and a duly-trained source model; an obtaining module 11 configured to obtain a value of a regularized loss function of the corresponding target model and a value of a cross-entropy loss function of the target model, based on the target model constructed by the construction module 10 and based on sets of training data in a training dataset of the target task; a training module 12 configured to, according to the value of the regularized loss function and the value of the cross-entropy loss function corresponding to each set of training data obtained by the obtaining module 11, update parameters in the target model by a gradient descent method and implement the training of the target model.

Principles employed by the apparatus for transfer learning in machine learning according to the present embodiment to implement the transfer learning in machine learning with the above modules and the achieved technical effects are the same as those of the above-mentioned method embodiments. For particulars, please refer to the depictions of the aforesaid relevant method embodiments, and no detailed depictions will be presented here.

Figure 3:
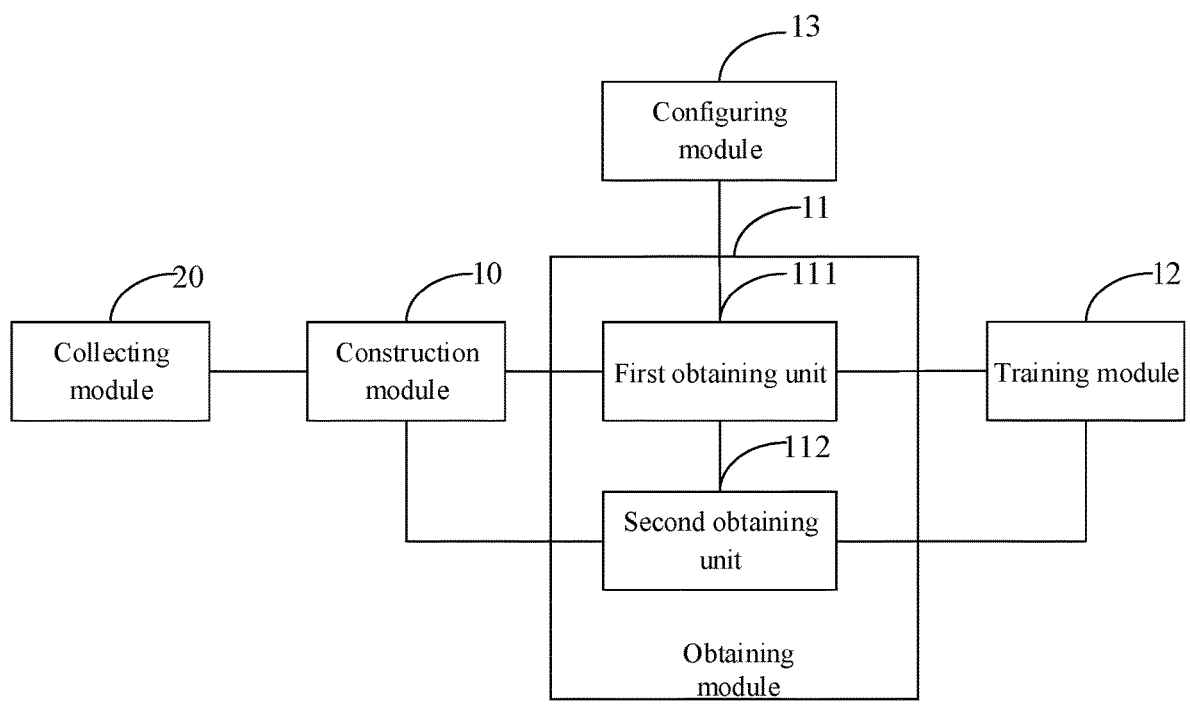
FIG. 3 is a block diagram of an apparatus for transfer leaning in machine learning according to a second embodiment of the present disclosure.

FIG. 3 is a block diagram of an apparatus for transfer leaning in machine learning according to a second embodiment of the present disclosure. As shown in FIG. 3, the apparatus for transfer leaning in machine learning of the present embodiment further introduces the technical solution of the present disclosure in more detail on the basis of the technical solution of the embodiment shown in FIG. 2.

As shown in FIG. 3, in the apparatus for transfer learning in machine learning in the present embodiment, the obtaining module 11 includes: a first obtaining unit 111 configured to obtain the value of the regularized loss function of the corresponding target model based on the target model constructed by the construction module 10 and based on a data portion of each set of training data in the training dataset of the target task; a second obtaining unit 112 configured to obtain the value of the cross-entropy loss function of the corresponding target model, based on the target model constructed by the construction module 10 and based on a tag portion of each set of training data in the training dataset of the target task.

Further optionally, the first obtaining unit 111 is specifically configured to: according to the data portion of each set of training data in the training dataset of the target task, respectively obtain feature maps of each filter in a feature extraction network layer of the target model and feature maps of each filter in a feature extraction network side layer of the source model; calculate a feature map loss of the corresponding filter, according to the feature maps of each filter in the feature extraction network layer of the target model and the feature maps of each filter in the feature extraction network layer of the source model, and an obtained attention weight of each filter; accumulate feature map losses of all filters as a value of a regularized loss function of the corresponding target model.

Furthermore optionally, the first obtaining unit 111 is specifically configured to: use formula Wi*Norm(FMSi−FMTi) to calculate the feature map loss of the corresponding filter, where Wi is an attention weight of the filter, FMSi and FMTi are respectively feature maps of the corresponding filter in the feature extraction network layers of the source model and the target model, and Norm employs L2 norm.

Further optionally, as shown in FIG. 3, the apparatus for transfer learning in machine learning in the present embodiment further includes: a configuring module 13 configured to configure an attention weight for each filter in the feature extraction network layer of the target model, according to the training dataset of the target task.

Correspondingly, the first obtaining unit 111 is specifically configured to calculate a feature map loss of the corresponding filter, according to the feature maps of each filter in the feature extraction network layer of the target model and the feature maps of each filter in the feature extraction network layer of the source model, and the attention weight of each filter obtained from a configuration result of the configuring module.

Further optionally, the configuring module 13 is specifically configured to: perform initial training for a fully-connected layer of the target model with the training dataset of the target task; calculate a value of a network loss function obtained after initial training; for the filters in the feature extraction network layer of the target model after the initial training, set the corresponding parameter to 0, and calculate a change amount of a corresponding value of the network loss function; normalize the change amounts of the values of the network loss function of all filters in the feature extraction network layer of the target model, to obtain the normalized change amount of the value of the network loss function of each filter, and regard the normalized change amount as the attention weight of the corresponding filter.

Further optionally, the construction module 10 is specifically configured to: replace the original fully-connected layer of the source model with a new fully-connected layer adapted for the number of classes to be implemented by the target task, to obtain the target model.

Further optionally, the training module 12 is specifically configured to: update the parameters in the target model by a gradient descent method by using the value of the regularized loss function obtained by the first obtaining unit 11 and the value of the cross-entropy loss function obtained by the second obtaining unit 12 corresponding to any set of training data, so that a sum of the value of the regularized loss function and the value of the cross-entropy loss function tends to be 0; update the parameters in the target model by the gradient descent method by using the value of the regularized loss function and the value of the cross-entropy loss function obtained with next set of training data and based on the updated parameters in the target model, so that the sum of the value of the regularized loss function and the value of the cross-entropy loss function tends to be 0; repeat the preceding step until completing a preset number of rounds of training with the respective sets of training data in the training dataset, determining the parameters of the target model and thereby determining the target model.

Principles employed by the apparatus for transfer learning in machine learning according to the present embodiment to implement the transfer learning in machine learning with the above modules and the achieved technical effects are the same as those of the above-mentioned method embodiments. For particulars, please refer to the depictions of the aforesaid relevant method embodiments, and no detailed depictions will be presented here.

Figure 4:
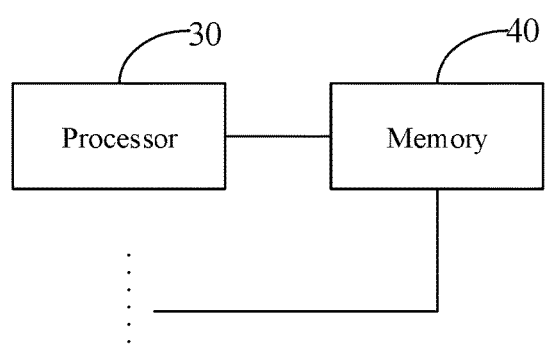
FIG. 4 is a block diagram of a computer device according to an embodiment of the present disclosure.

FIG. 4 is a block diagram of a computer device according to an embodiment of the present disclosure. As shown in FIG. 4, the computer device according to the present embodiment includes: one or more processors 30, and a memory 40 for storing one or more programs; the one or more programs stored in the memory 40, when executed by said one or more processors 30, enable said one or more processors 30 to implement the method for transfer learning in machine learning in the embodiments shown in FIG. 1. The embodiment shown in FIG. 4 exemplarily includes a plurality of processors 30.

Figure 5:
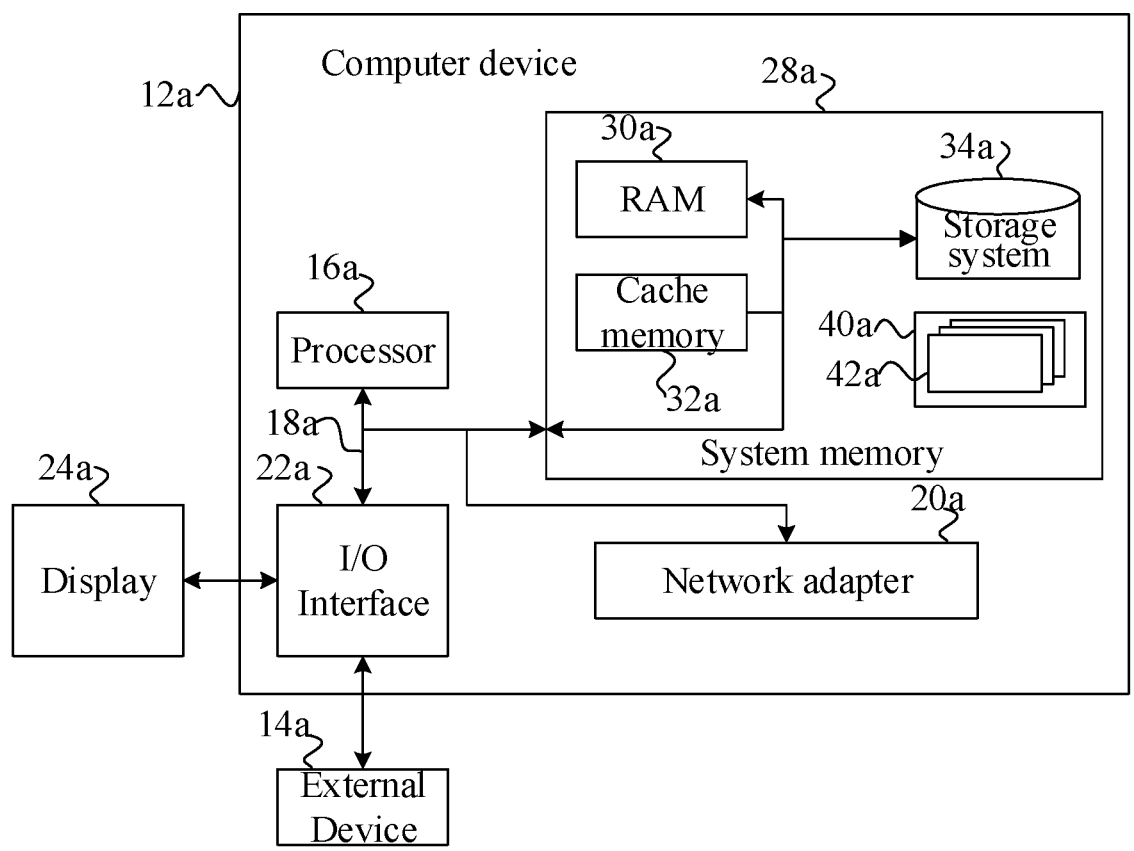
FIG. 5 is an example diagram of a computer device according to the present disclosure.

For example, FIG. 5 is an example diagram of a computer device according to the present disclosure. FIG. 5 shows a block diagram of an example computer device 12*a* adapted to implement an implementation mode of the present disclosure. The computer device 12*a* shown in FIG. 5 is only an example and should not bring about any limitation to the function and scope of use of the embodiments of the present disclosure.

As shown in FIG. 5, the computer device 12*a* is shown in the form of a general-purpose computing device. The components of computer device 12*a* may include, but are not limited to, one or more processors 16*a*, a system memory 28*a*, and a bus 18*a* that couples various system components including the system memory 28*a* and the processors 16*a*.

Bus 18*a* represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12*a* typically includes a variety of computer system readable media. Such media may be any available media that is accessible by computer device 12*a*, and it includes both volatile and non-volatile media, removable and non-removable media.

The system memory 28*a* can include computer system readable media in the form of volatile memory, such as random access memory (RAM) 30*a* and/or cache memory 32*a*. Computer device 12*a* may further include other removable/non-removable, volatile/non-volatile computer system storage media. By way of example only, storage system 34*a* can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18*a* by one or more data media interfaces. The system memory 28*a* may include at least one program product having a set (e.g., at least one) of program modules that are configured to carry out the functions of embodiments shown in FIG. 1-FIG. 3 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the method for transfer learning in machine learning in the above embodiments.

The present disclosure further provides a computer readable medium on which a computer program is stored, the program, when executed by a processor, implementing the end-to-end character recognition method shown in the above embodiments.

The computer readable medium of the present embodiment may include RAM 30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc mad-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read- Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for transfer learning in machine learning, wherein the method comprises:
    constructing a target model according to the number of classes to be achieved by a target task and a duly-trained source model;
    obtaining a value of a regularized loss function of the corresponding target model and a value of a cross-entropy loss function of the target model, based on sets of training data in a training dataset of the target task; and
    according to the value of the regularized loss function and the value of the cross-entropy loss function corresponding to each set of training data, updating parameters in the target model by a gradient descent method to implement the training of the target model,
    wherein the obtaining a value of a regularized loss function of the corresponding target model comprises:
    according to the data portion of each set of training data in the training dataset of the target task, respectively obtaining feature maps of each filter in a feature extraction network layer of the target model and feature maps of each filter in a feature extraction network side layer of the source model;
    calculating a feature map loss of the corresponding filter, according to the feature maps of each filter in the feature extraction network layer of the target model and the feature maps of each filter in the feature extraction network layer of the source model, and an obtained attention weight of each filter; and
    accumulating feature map losses of all filters as a value of a regularized loss function of the corresponding target model.

2. The method according to claim 1, wherein the obtaining a value of a cross-entropy loss function of the target model, based on sets of training data in a training dataset of the target task comprises:
    obtaining the value of the cross-entropy loss function of the corresponding target model, based on a tag portion of each set of training data in the training dataset of the target task.

3. The method according to claim 1, wherein the calculating a feature map loss of the corresponding filter, according to the feature maps of each filter in the feature extraction network layer of the target model and the feature maps of each filter in the feature extraction network layer of the source model, and an obtained attention weight of each filter comprises:
    using formula Wi*Norm(FMSi-FMTi) to calculate the feature map loss of the corresponding filter;
    where Wi is an attention weight of the filter, FMSi and FMTi are respectively feature maps of the corresponding filter in the feature extraction network layers of the source model and the target model, and Norm employs L2 norm.

4. The method according to claim 1, wherein before obtaining a value of a regularized loss function of the corresponding target model and a value of a cross-entropy loss function of the target model, based on sets of training data in a training dataset of the target task, the method further comprises:
    configuring an attention weight for each filter in the feature extraction network layer of the target model, according to the training dataset of the target task.

5. The method according to claim 4, wherein the configuring an attention weight for each filter in the feature extraction network layer of the target model, according to the training dataset of the target task comprises:
    performing initial training for a fully-connected layer of the target model with the training dataset of the target task;
    calculating a value of a network loss function obtained after initial training;
    for the filters in the feature extraction network layer of the target model after the initial training, setting the corresponding parameter to 0, and calculating a change amount of a corresponding value of the network loss function; and
    normalizing the change amounts of the values of the network loss function of all filters in the feature extraction network layer of the target model, to obtain the normalized change amount of the value of the network loss function of each filter, and taking the normalized change amount as the attention weight of the corresponding filter.

6. The method according to claim 1, wherein the constructing a target model according to the number of classes to be achieved by a target task and a duly-trained source model comprises:
    replacing the original fully-connected layer of the source model with a new fully-connected layer adapted for the number of classes to be implemented by the target task, to obtain the target model.

7. The method according to claim 1, wherein according to the value of the regularized loss function and the value of the cross-entropy loss function corresponding to each set of training data, updating parameters in the target model by a gradient descent method to implement the training of the target model comprises:
    updating the parameters in the target model by a gradient descent method by using the value of the regularized loss function and the value of the cross-entropy loss function corresponding to any set of training data, so that a sum of the value of the regularized loss function and the value of the cross-entropy loss function tends to be 0;
    updating the parameters in the target model by the gradient descent method by using the value of the regularized loss function and the value of the cross-entropy loss function obtained with next set of training data and based on the updated parameters in the target model, so that the sum of the value of the regularized loss function and the value of the cross-entropy loss function tends to be 0; and
    repeating the preceding step until completing a preset number of rounds of training with the respective sets of training data in the training dataset, determining the parameters of the target model and thereby determining the target model.

8. A computer device, wherein the device comprises:
    one or more processors,
    a memory for storing one or more programs,
    the one or more programs, when executed by said one or more processors, enable said one or more processors to implement a method for transfer learning in machine learning, wherein the method comprises:

constructing a target model according to the number of classes to be achieved by a target task and a duly-trained source model;

obtaining a value of a regularized loss function of the corresponding target model and a value of a cross-entropy loss function of the target model, based on sets of training data in a training dataset of the target task; and according to the value of the regularized loss function and the value of the cross-entropy loss function corresponding to each set of training data, updating parameters in the target model by a gradient descent method to implement the training of the target model, wherein the obtaining a value of a regularized loss function of the corresponding target model comprises:

according to the data portion of each set of training data in the training dataset of the target task, respectively obtaining feature maps of each filter in a feature extraction network layer of the target model and feature maps of each filter in a feature extraction network side layer of the source model;

calculating a feature map loss of the corresponding filter, according to the feature maps of each filter in the feature extraction network layer of the target model and the feature maps of each filter in the feature extraction network layer of the source model, and an obtained attention weight of each filter; and accumulating feature map losses of all filters as a value of a regularized loss function of the corresponding target model.

9. The computer device according to claim 8, wherein the obtaining a value of a cross-entropy loss function of the target model, based on sets of training data in a training dataset of the target task comprises:

obtaining the value of the cross-entropy loss function of the corresponding target model, based on a tag portion of each set of training data in the training dataset of the target task.

10. The computer device according to claim 8, wherein the calculating a feature map loss of the corresponding filter, according to the feature maps of each filter in the feature extraction network layer of the target model and the feature maps of each filter in the feature extraction network layer of the source model, and an obtained attention weight of each filter comprises:

using formula Wi*Norm(FMSi-FMTi) to calculate the feature map loss of the corresponding filter;

where Wi is an attention weight of the filter, FMSi and FMTi are respectively feature maps of the corresponding filter in the feature extraction network layers of the source model and the target model, and Norm employs L2 norm.

11. The computer device according to claim 8, wherein before obtaining a value of a regularized loss function of the corresponding target model and a value of a cross-entropy loss function of the target model, based on sets of training data in a training dataset of the target task, the method further comprises:

configuring an attention weight for each filter in the feature extraction network layer of the target model, according to the training dataset of the target task.

12. The computer device according to claim 11, wherein the configuring an attention weight for each filter in the feature extraction network layer of the target model, according to the training dataset of the target task comprises:

performing initial training for a fully-connected layer of the target model with the training dataset of the target task;

calculating a value of a network loss function obtained after initial training;

for the filters in the feature extraction network layer of the target model after the initial training, setting the corresponding parameter to 0, and calculating a change amount of a corresponding value of the network loss function; and normalizing the change amounts of the values of the network loss function of all filters in the feature extraction network layer of the target model, to obtain the normalized change amount of the value of the network loss function of each filter, and taking the normalized change amount as the attention weight of the corresponding filter.

13. The computer device according to claim 8, wherein the constructing a target model according to the number of classes to be achieved by a target task and a duly-trained source model comprises:

replacing the original fully-connected layer of the source model with a new fully-connected layer adapted for the number of classes to be implemented by the target task, to obtain the target model.

14. The computer device according to claim 8, wherein according to the value of the regularized loss function and the value of the cross-entropy loss function corresponding to each set of training data, updating parameters in the target model by a gradient descent method to implement the training of the target model comprises:

updating the parameters in the target model by a gradient descent method by using the value of the regularized loss function and the value of the cross-entropy loss function corresponding to any set of training data, so that a sum of the value of the regularized loss function and the value of the cross-entropy loss function tends to be 0;

updating the parameters in the target model by the gradient descent method by using the value of the regularized loss function and the value of the cross-entropy loss function obtained with next set of training data and based on the updated parameters in the target model, so that the sum of the value of the regularized loss function and the value of the cross-entropy loss function tends to be 0; and repeating the preceding step until completing a preset number of rounds of training with the respective sets of training data in the training dataset, determining the parameters of the target model and thereby determining the target model.

15. A non-transitory computer readable medium on which a computer program is stored, wherein the program, when executed by a processor, implements a method for transfer learning in machine learning, wherein the method comprises:

constructing a target model according to the number of classes to be achieved by a target task and a duly-trained source model;

obtaining a value of a regularized loss function of the corresponding target model and a value of a cross-entropy loss function of the target model, based on sets of training data in a training dataset of the target task; and according to the value of the regularized loss function and the value of the cross-entropy loss function corresponding to each set of training data, updating parameters in the target model by a gradient descent method to implement the training of the target model, wherein the obtaining a value of a regularized loss function of the corresponding target model comprises:

according to the data portion of each set of training data in the training dataset of the target task, respectively obtaining feature maps of each filter in a feature extraction network layer of the target model and feature maps of each filter in a feature extraction network side layer of the source model;

calculating a feature map loss of the corresponding filter, according to the feature maps of each filter in the feature extraction network layer of the target model and the feature maps of each filter in the feature extraction network layer of the source model, and an obtained attention weight of each filter; and accumulating feature map losses of all filters as a value of a regularized loss function of the corresponding target model.

16. The non-transitory computer readable medium according to claim 15, wherein the obtaining a value of a cross-entropy loss function of the target model, based on sets of training data in a training dataset of the target task comprises:

obtaining the value of the cross-entropy loss function of the corresponding target model, based on a tag portion of each set of training data in the training dataset of the target task.

17. The non-transitory computer readable medium according to claim 15, wherein the calculating a feature map loss of the corresponding filter, according to the feature maps of each filter in the feature extraction network layer of the target model and the feature maps of each filter in the feature extraction network layer of the source model, and an obtained attention weight of each filter comprises:

using formula Wi*Norm(FMSi-FMTi) to calculate the feature map loss of the corresponding filter;

where Wi is an attention weight of the filter, FMSi and FMTi are respectively feature maps of the corresponding filter in the feature extraction network layers of the source model and the target model, and Norm employs L2 norm.

* * * * *